United States Patent [19]

Kawata

[11] Patent Number: 5,711,874
[45] Date of Patent: Jan. 27, 1998

[54] WATER TREATING APPARATUS

[75] Inventor: Takashi Kawata, Gamagori, Japan

[73] Assignee: I.B.E. Co., Ltd., Aichi, Japan

[21] Appl. No.: 561,359

[22] Filed: Nov. 21, 1995

[51] Int. Cl.$^6$ ............................................. B01D 35/24
[52] U.S. Cl. .................. 210/223; 210/268; 210/321.7; 210/359; 210/926
[58] Field of Search ........................ 210/268, 321.7, 210/363, 359, 926, 223

[56] References Cited

U.S. PATENT DOCUMENTS

| | | | |
|---|---|---|---|
| 3,425,562 | 2/1969 | Hamer | 210/321.1 |
| 4,591,437 | 5/1986 | Emryd et al. | 210/266 |
| 4,940,667 | 7/1990 | Goldstein et al. | 436/150 |
| 4,988,436 | 1/1991 | Cole | 210/169 |
| 5,006,245 | 4/1991 | Yukishita | 210/288 |
| 5,230,773 | 7/1993 | Perman et al. | 210/730 |

*Primary Examiner*—W. L. Walker
*Attorney, Agent, or Firm*—Donald S. Dowden

[57] ABSTRACT

A water treating apparatus consisting of a water path having entrance(s) and exit(s) and ceramic grain(s) movably inserted in said water path is provided in the present invention. When water is put in said water path of said water treating apparatus, said ceramic grains may be moved and rolled by the pressure of said water flowing in said water path and said moving and rolling ceramic grains may disturb the flow of said water to intensify the effectiveness of water treatment by said ceramic grains.

1 Claim, 1 Drawing Sheet

WATER TREATING APPARATUS

[FIELD OF THE INVENTION]

The present invention relates to a water treating apparatus used to improve qualities of the water. More particularly, the present invention relates to a water treating apparatus consisting of a water path having entrance(s) and exit(s) and ceramic grain(s) movably inserted in said water path.

[DESCRIPTION OF THE PRIOR ART]

Hitherto, a water treating apparatus consisting of a column and ceramic grains packed in said column has been provided. The water is put in said column of said water treating apparatus, said water contacts with said ceramic grains and then said water is discharged from said column. It is expected that clusters of the water become smaller by contacting ceramic to improve qualities of the water such as taste, effectiveness of absorption to plants, and the like.

Nevertheless, the effectiveness of the improvement of the qualities of the water in said traditional water treating apparatus has been very small and sometimes it has been judged that said traditional water treating apparatus has no effectiveness to improve qualities of the water.

[SUMMARY OF THE INVENTION]

Accordingly, an object of the present invention is to provide a water treating apparatus having a high effectiveness to improve qualities of the water.

A further object of the present invention is to provide water having small size clusters resulting in good taste and good effectiveness of absorption to plants.

[DETAILED DESCRIPTION OF THE PREFERRED EMBODIMENT]

Figure 1:
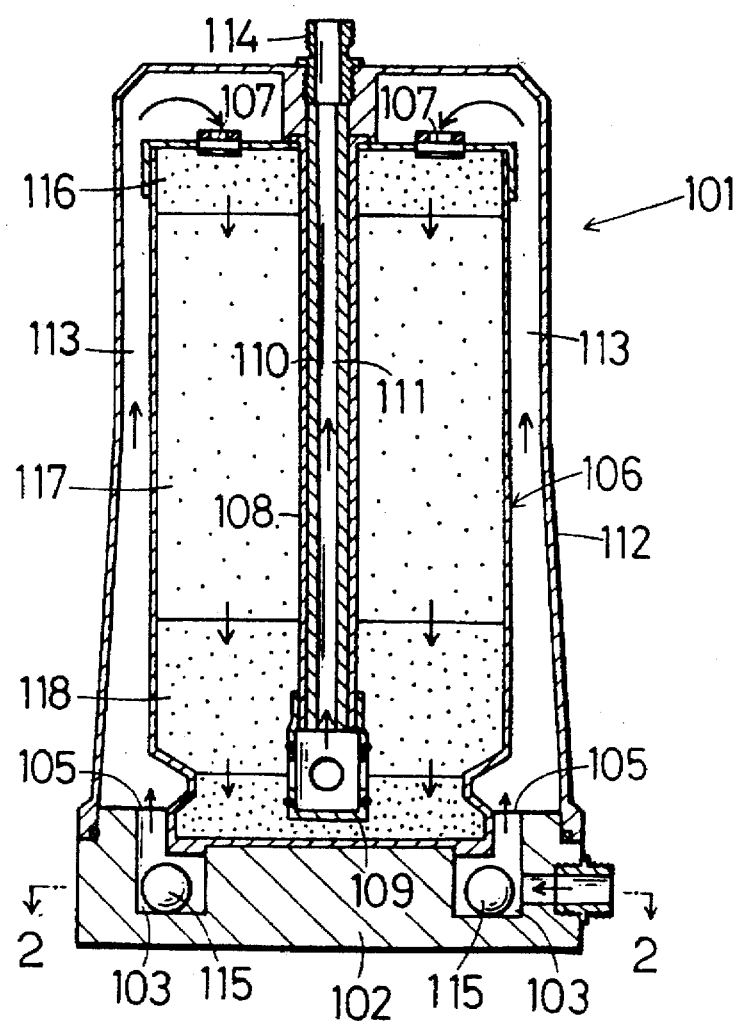
FIG. 1 is a side sectional view of an embodiment of the present invention.

Referring now to FIG. 1, a water treating apparatus (101) consisting of a base (102) in which a ring ditch (103) as a water path is formed, wherein a water introducing path (104) having an entrance (104A) obliquely connects to the side of said ring ditch (103) and a plural number of exits (105) connect to the upper side of said ring ditch (103), a column (106) equipped on said base (102) wherein a plural number of entrances (107) are arranged on the upper side thereof, a center pipe (108) wherein a perforated tube (109) is attached to the lower end thereof, a tubular magnet (110) forming a water path (111) therein and inserted in said center pipe (108), and an outer cover (112) covering said column (106) wherein a water path (113) connecting to said exits (105) of said base (102) and entrances (107) of said column (106) is formed between said column (106) and said outer cover (112) and a discharging tube (114) is connected to the upper end of said tubular magnet (110) through the upper side of said outer cover (112).

A plural number of spherical ceramic grains (115) are movably inserted in said ring ditch (103) of said base (102). Said ceramic grains (115) may be made of a ceramic such as alumina, β-spodumene, zirconia, silica, titania and the like and a mixture of two or more kinds of said ceramic.

A ceramic powder or grains (116) made of the same ceramic as used in ceramic grains (115), an active carbon powder or grains (117) such as coconut shell active carbon powder or grains and a coral sand (118) are packed in said column (106).

The water to be treated is put into said water treating apparatus (101) from the water introducing path (104) of said base (102) through the entrance (104A) and said water flows in said ring ditch (103) as a water path.

While said water flows in said ring ditch (103) said water contacts with said ceramic grains (115) and said ceramic grains (115) are moved and rolled by the pressure of said water flowing in said ring ditch (103). A far infrared radiation is radiated from said ceramic grains (115) and the size of cluster of said water may become small by said far infrared radiation. Further, the flow of said water is disturbed by said moving and rolling ceramic grains (115) and the effectiveness of said far infrared radiation of said ceramic grains (115) may be remarkably intensified.

After that said water treated by said moving and rolling ceramic grains is discharged from said ring ditch (103) through said exits (105) and flow into said water path (113) between said column (106) and said outer cover (112). Said water in said water path (113) flows into said column (106) through entrances (107) of said column (106) and said water passes through the layer of said ceramic powder or grains (116), the layer of said active carbon powder or grains (117) and the layer of said coral sand (118) successively., and then said water flows into the water path (111) of said tubular magnet (110) to be treated by the magnetic energy of said tubular magnet (110). Said water treated in said water treating apparatus (101) is discharged from said discharging tube (114) connected to the upper end of said tubular magnet (110).

EXAMPLE 1

Figure 2:
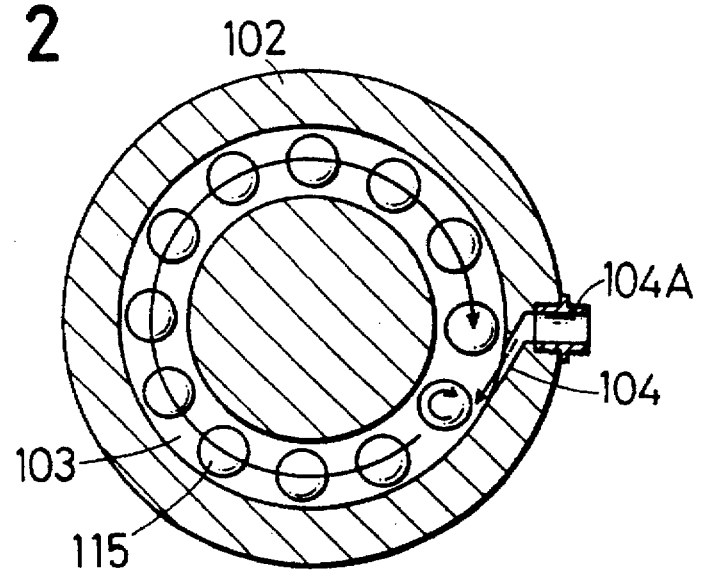
FIG. 2 is a cross sectional view along a line 2—2 of FIG. 1.

Water was treated by using said water treating apparatus shown in FIG. 1 and FIG. 2 wherein said water flows along the arrow shown in FIG. 2 in said ring ditch (103) of said base (102). The relation between the size of cluster of said water and the number of said ceramic grains (115) inserted in said ring ditch (103) of said base (102) was determined and the result is shown in Table 1.

TABLE 1

| Water | Number of ceramic grains | $^{17}$O-NMR spectral line width* (Hz) |
|-------|--------------------------|-----------------------------------------|
| A     | 10                       | 60.2                                    |
| B     | 5                        | 65.7                                    |
| C     | 2                        | 87.6                                    |
| D     | 0                        | 93.4                                    |

*To measure the size of the cluster of the water, $^{17}$O-NMR spectroscopy was used and spectral line width relates to the size of the cluster of the water.

Referring to Table 1, it may be clear that as the number of ceramic grains treating the water increases, the size of the cluster of the water becomes smaller.

EXAMPLE 2

Water samples A, B, C and D treated in EXAMPLE 1 were used to cultivate the pumpkin. Seeds of the pumpkin were immersed in each water sample A, B, C and D for 10 minutes and then 10 seeds treated by each water sample A, B, C and D were put in each schale and each schale was kept at 25° C. After 10 days, the length of seed root and hypocotyl and the number of side roots were measured.

The results are shown in Table 2.

TABLE 2

| Water Sample | Number of ceramic grains | The length of seed root (mm) | Number of side roots | The length of hypocotyl (mm) | Weight (g) |
| --- | --- | --- | --- | --- | --- |
| A | 10 | 10.3 | 15.9 | 2.2 | 7.5 |
| B | 5 | 7.0 | 10.9 | 1.1 | 5.0 |
| C | 2 | 5.0 | 6.7 | 0.6 | 3.5 |
| D | 0 | 4.1 | 5.0 | 0.3 | 3.0 |

Values in Table 2 are average of 10 seeds respectively.

Referring to Table 2, it may be clear that as the number of ceramic grains treating the water increases, the growth of plants are more promoted.

EXAMPLE 3

The same test as EXAMPLE 2 was carried out by using water sample A excepting that the water flows along the opposite direction to the arrow shown in FIG. 2.

The result is shown in Table 3.

TABLE 3

| Water Sample | Number of ceramic grains | The length of seed root (mm) | Number of side roots | The length of hypocotyl (mm) | Weight (g) |
| --- | --- | --- | --- | --- | --- |
| A | 10 | 4.8 | 6.4 | 0.8 | 3.3 |

Comparing the result shown in Table 3 with the result shown in Table 2, it may be clear that when the water flows along the arrow in FIG. 2 (right turn), much better result is obtained than the case where the water flows along the opposite direction to the arrow (left turn).

EXAMPLE 4

Using water samples A, B, C and D in EXAMPLE 1, rice was cooked. Namely, 300 g of rice was washed by 300 cc of each water sample A, B, C and D 4 times and then 400 cc of each water sample A, B, C and D was added to said washed rice and kept for 60 minutes at the room temperature. After then said rice was cooked in the pot with each water sample. The situation of cooking was observed for each water sample A, B, C and D and the results are shown in Table 4.

TABLE 4

| Water Sample | Number of ceramic grains | The necessary time for cooking rice |
| --- | --- | --- |
| A | 10 | 45 min 10 sec |
| B | 5 | 48 min 12 sec |
| C | 2 | 49 min 56 sec |
| D | 0 | 63 min 47 sec |

Referring to Table 4, it may be clear that as the number of ceramic grains treating the water increases, the necessary time for cooking rice becomes shorter.

EXAMPLE 5

5 cut carnations having a length of 20 cm were put in a vessel having a volume of 800 ml which is filled with 500 ml of each water sample A, B, C and D treated in EXAMPLE 1 and were kept at the room temperature.

The situation of said cut flowers were observed and the results are shown in Table 5.

TABLE 5

| Lapse | Situation | Water Sample | | | |
| --- | --- | --- | --- | --- | --- |
| | | A | B | C | D |
| 0 | Keep fresh | 5 | 5 | 5 | 5 |
| | Droop | 0 | 0 | 0 | 0 |
| | Wither | 0 | 0 | 0 | 0 |
| 20 days | Keep fresh | 5 | 4 | 3 | 3 |
| | Droop | 0 | 1 | 2 | 2 |
| | Wither | 0 | 0 | 0 | 0 |
| 24 days | Keep fresh | 4 | 3 | 1 | 0 |
| | Droop | 1 | 2 | 4 | 4 |
| | Wither | 0 | 0 | 0 | 1 |
| 28 days | Keep fresh | 3 | 2 | 1 | 0 |
| | Droop | 2 | 2 | 1 | 1 |
| | Wither | 0 | 1 | 3 | 4 |
| 29 days | Keep fresh | 3 | 2 | 1 | 0 |
| | Droop | 0 | 0 | 0 | 0 |
| | Wither | 2 | 3 | 4 | 5 |

Referring to Table 5, it may be clear that as the number of ceramic grains treating the water increases, the effectiveness to keep freshness of flower becomes greater.

EXAMPLE 6

Using water samples A, B, C and D in EXAMPLE 1, coffee was made. Namely, 30 g of ground coffee berry (Riad: Brazil coffee and Mineiro: Brazil coffee) was extracted by 500 cc of each water sample A, B, C and D heated at 85° C. respectively. Sourness, taste and flavor of each coffee were examined by 8 persons.

The results are shown in Table 6.

TABLE 6

| Water Sample | | A | B | C | D |
| --- | --- | --- | --- | --- | --- |
| Number of ceramic grains | | 10 | 5 | 2 | 0 |
| Riado | Sourness | − | − | − | + |
| | Taste | +++ | +++ | ++ | − |
| | Flavor | +++ | ++ | ++ | − |
| Mineiro | Sourness | − | − | − | + |
| | Taste | +++ | ++ | + | − |
| | Flavor | +++ | ++ | ++ | − |

Estimation:
Sourness
+++ strong sourness
++ sourness
+ slight sourness
— no sourness
Taste and Flavor
+++ excellent
++ good
+ a little good
— no good Referring to Table 6, it may be clear that as the number of ceramic grains treating the water increases, the effectiveness to improve taste of coffee becomes greater.

EXAMPLE 7

50 g of sliced radish was dipped in 200 ml of each water sample A, B, C and D treated in EXAMPLE 1 for 15 minutes and then sliced radish was taken out from each water sample. Said treated sliced radish was then put in a polyethylene bag to keep at the room temperature. Situation of said treated sliced radish was observed and the results are shown in Table 7.

TABLE 7

| Water Sample | After 5 days | After 16 days |
| --- | --- | --- |
| A | Very slightly brownish | Slightly brownish, no decomposition |
| B | Slightly brownish | Brownish, slight decomposition |
| C | A little brownish | Brownish, partial decomposition |
| D | Brownish | Brownish, remarkable decomposition |

Referring to Table 7, it may be clear that as the number of ceramic grains treating the water increases, the effectiveness to keep freshness of sliced radish becomes greater.

I claim:

1. A water treating apparatus comprising a water path having entrance(s) and exit (s) and ceramic grains(s) movably inserted in said water path, wherein the entrance(s) connect(s) to a column in which one or more kinds of water treating agent(s) is(are) packed, and wherein a tubular magnet connects to said column.

* * * * *